(12) United States Patent
Hirsbrunner et al.

(10) Patent No.: US 7,414,992 B2
(45) Date of Patent: Aug. 19, 2008

(54) METHOD AND APPARATUS FOR PROVIDING A HAND-IN TO A WIRELESS LOCAL AREA NETWORK

(75) Inventors: Alex P. Hirsbrunner, Bloomingdale, IL (US); Anatoly S. Belkin, Glenview, IL (US); Ajaykumar Idnani, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 867 days.

(21) Appl. No.: 10/609,710

(22) Filed: Jun. 30, 2003

(65) Prior Publication Data

US 2004/0264424 A1 Dec. 30, 2004

(51) Int. Cl.
*H04Q 7/00* (2006.01)
(52) U.S. Cl. ............... 370/331; 370/338; 455/437; 455/444; 455/552.1; 455/553.1
(58) Field of Classification Search ............... None
See application file for complete search history.

(56) References Cited

U.S. PATENT DOCUMENTS

| | | | |
|---|---|---|---|
| 6,192,239 B1 | 2/2001 | Lee et al. | |
| 6,243,581 B1 * | 6/2001 | Jawanda | 455/432.2 |
| 6,473,413 B1 | 10/2002 | Chiou et al. | |
| 6,657,981 B1 | 12/2003 | Lee et al. | |
| 6,985,732 B1 * | 1/2006 | Ekman et al. | 455/436 |
| 7,039,027 B2 * | 5/2006 | Bridgelall | 370/329 |
| 7,089,005 B2 * | 8/2006 | Reddy | 455/436 |
| 2002/0085516 A1 | 7/2002 | Bridgelall | |
| 2003/0021400 A1 * | 1/2003 | Grandgent et al. | 379/202.01 |
| 2004/0008645 A1 * | 1/2004 | Janevski et al. | 370/331 |
| 2004/0137901 A1 * | 7/2004 | Hamasaki et al. | 455/436 |
| 2004/0218744 A1 * | 11/2004 | Nguyen et al. | 379/202.01 |
| 2004/0266426 A1 * | 12/2004 | Marsh et al. | 455/426.2 |

FOREIGN PATENT DOCUMENTS

GB 2321165 A 7/1998

\* cited by examiner

*Primary Examiner*—Wing F. Chan
*Assistant Examiner*—Robert C Scheibel

(57) ABSTRACT

A communication unit (10) with dual-mode operating capability comprises: a receiver (203, 204) and a transmitter (207, 208) for supporting an initial connection with another communication unit (12) on a first wireless network (16, 18, 20); and a controller (205), coupled to and controlling the receiver and transmitter, to maintain the initial connection and receive messages from or send messages to the other communications unit to effectuate a new connection over a second wireless network (11). A corresponding method includes while participating in an initial connection (302) detecting availability of a new connection (304) and establishing the new connection by exchanging messages between the communication units over the initial connection (310, 312).

14 Claims, 2 Drawing Sheets

METHOD AND APPARATUS FOR PROVIDING A HAND-IN TO A WIRELESS LOCAL AREA NETWORK

BACKGROUND OF THE INVENTION

1. Field of the Invention

The present invention relates generally to mobile communication units and networks, and, more particularly, to a method and apparatus for providing a hand-in for such mobile communication units between networks.

2. Description of the Related Art

Loosely coupled Wireless Local Area Networks (WLAN) defined by enterprise servers provide users with high-speed wireless Internet access and an inexpensive alternative to telephone services as well as other real-time applications. The users can carry a wireless communication unit (referred to as a communication unit) with dual-use capability so that the communication unit can provide voice and data communication over the enterprise server when the communication unit is in a WLAN (in a coverage area and registered with the WLAN) and over a cellular wide area network (cellular network) such as any of the cellular networks when the communication unit is outside of the WLAN.

When the user is moving between different networks such as, for example, from a cellular network to the WLAN, while on a call, the call must be handed-in to the WLAN without a disruption in communication unit service. This is difficult because the necessary switching equipment is in the cellular base transfer site associated with the cellular network. What is needed is a method and apparatus for providing a hand-in for a communication unit during an on-going call when the communication unit moves between different networks.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages all in accordance with the present invention.

DETAILED DESCRIPTION OF THE PREFERRED EXEMPLARY EMBODIMENTS

Figure 1:
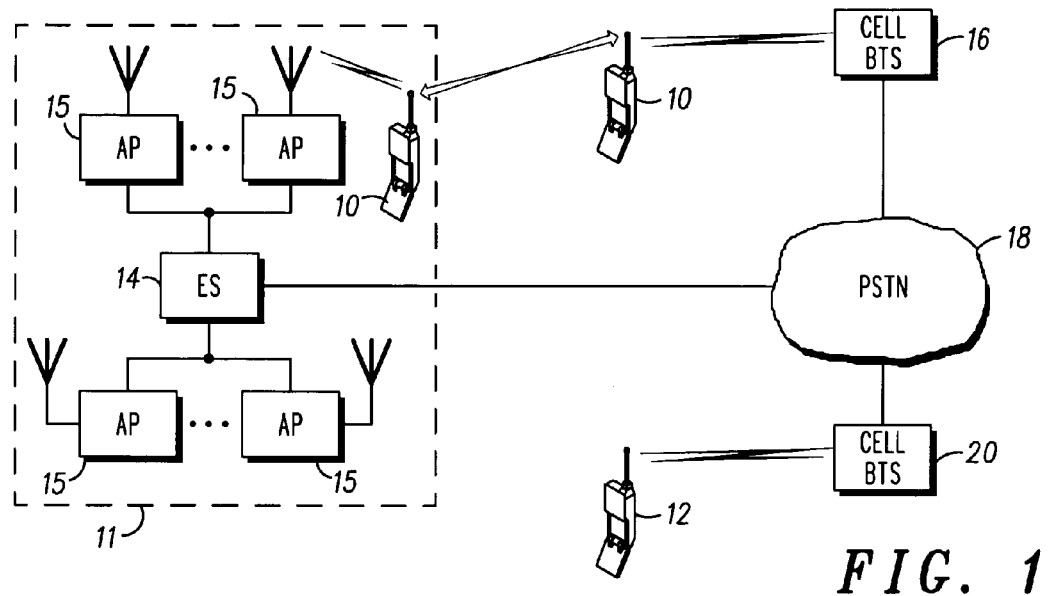
FIG. 1 depicts, in a simplified and representative form, an exemplary environment in which a method and apparatus are implemented for providing a hand-in to a wireless local area network.

In overview, the present disclosure concerns wireless communications devices or units, often referred to as communication units, such as cellular phone or two-way radios and the like or specifically units that have dual operating mode capability and communications systems that provide services such as voice and data communications services to such communication units. More particularly, various inventive concepts and principles are embodied in systems, communication units, and methods therein for providing the communication unit with a hand-in between different networks. Note that communication unit may be used interchangeably herein with wireless subscriber device or unit and each of these terms denotes a device ordinarily associated with a user and typically a wireless mobile device that may be used with a public network in accordance with a service agreement or within a private network. Examples of such include personal digital assistants, personal assignment pads, and personal computers equipped for wireless operation, a cellular handset or device, or equivalents thereof provided such units are arranged and constructed for operation in different networks. Note that different networks may refer to a cellular wide area network and a wireless local area network or first and second wireless local area networks.

The communication systems and communication units that are of particular interest are those that may provide or facilitate voice communications services or data or messaging services over wide area networks (WANs), such as conventional two way systems and devices, various cellular phone systems including analog and digital cellular, CDMA (code division multiple access) and variants thereof, GSM, GPRS (General Packet Radio System), 2.5 G and 3 G systems such as UMTS (Universal Mobile Telecommunication Service) systems, integrated digital enhanced networks and variants or evolutions thereof. Furthermore the wireless communication units or devices of interest have short range communications capability normally referred to as WLAN capabilities, such as IEEE 802.11, Bluetooth, or Hiper-Lan and the like that preferably utilize CDMA, frequency hopping, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed below various inventive principles and combinations thereof are advantageously employed so that a communication unit can detect coverage for a wireless local area network, send a hand-in request to a target communication unit when the coverage is detected, accept a new connection with the target communication unit over the wireless local area network from the target communication unit, and terminate the initial connection with the target communication unit on the initial network.

Referring now to FIG. 1, a simplified and representative environment or system in which a preferred embodiment of a method and apparatus are implemented for providing a hand-in to a wireless local area network will be discussed and described. The system generally shows a first communication unit 10 that is moving between a wireless local area network (WLAN) 11 and a wireless or cellular wide area network (WAN). The WLAN 11 and services thereon is provided by an enterprise server 14 coupled to a plurality of access points 15. The WAN and services thereon is provided by a plurality of cellular base transmitter sites with one (BTS) 16 depicted together with a mobile switching center (MSC) (not shown). The communication unit 10 is in contact with another communication unit that is depicted generally by 12 and will be referred to as a target communication unit. The target communication unit 12 obtains WAN service from a different BTS 20, which is connected to the first BTS 16 and thus the communication unit 10 via a public switched network, such as the public switched telephone network (PSTN) 18 as is known.

Figure 2:
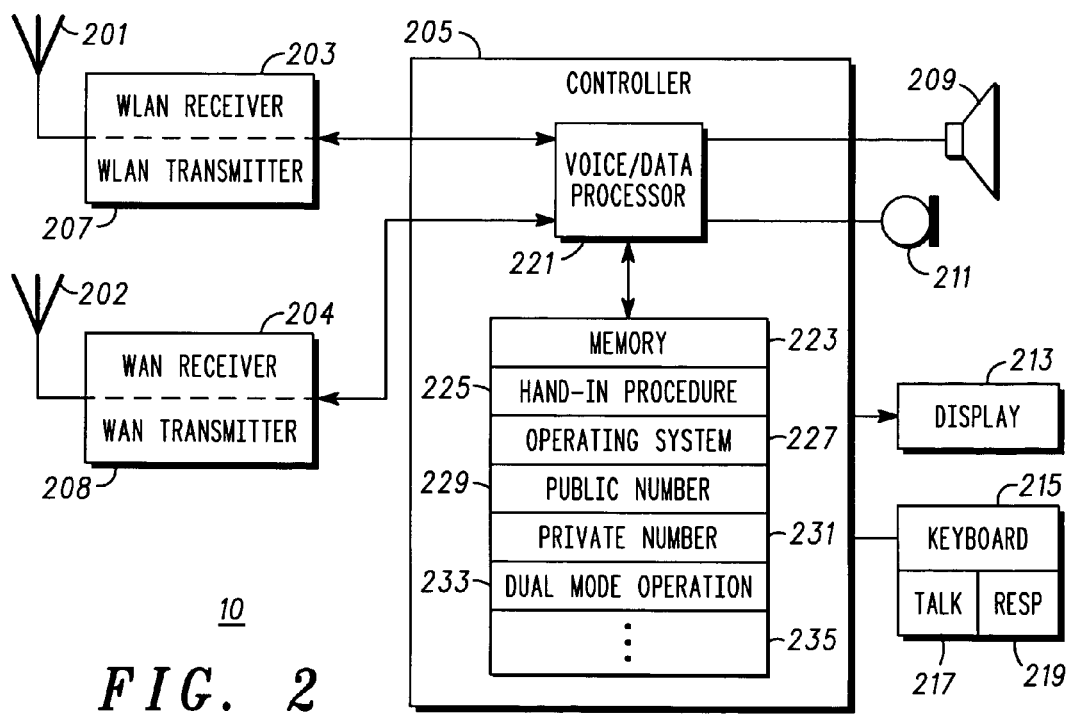
FIG. 2 depicts a block diagram of a communication unit arranged for providing a hand-in between different networks.

Referring to FIG. 2, a block diagram of a preferred embodiment of the first communication unit 10 as well as the target communication unit 12, which are both arranged for effectuating a hand-in between different networks, will be discussed and described. Each of the communication units 10, 12 includes a first antenna 201 that operates to absorb and radiate radio frequency signals. Radio signals that are transmitted from a WLAN, such as, for example, one of the access points 15 (or LAN transceiver) coupled to the enterprise server 14 are absorbed by the first antenna and coupled to a WLAN receiver (or receiving device) 203. Signals that are amplified by and coupled from a WLAN transmitter (or transmitting device) 207 to the antenna are radiated or transmitted or sent to the access point 15 and thus the enterprise server 14 as is known. The WLAN receiver and transmitter 203, 207 are preferably known IEEE 802.11 compatible devices that are inter coupled as depicted and interactively operate with and are controlled by a controller 205 to provide to, or accept or receive from the controller 205, voice traffic or data messages or signals corresponding thereto as is also known.

Each of the communication units 10, 12 also includes a second antenna 202 that operates to absorb and radiate radio frequency signals that are, respectively, received from a cellular WAN or transmitted or sent to the WAN. The communication unit 10 also includes a WAN receiver 204 that the absorbed signals from the cellular BTS 16 are coupled to and a WAN transmitter 208 that amplifies and provides the signals for transmission or radiation by the antenna 202 to a cellular network such as the cellular BTS 16 as is known. The WAN receiver 204 and transmitter 208 are inter coupled as depicted and interactively operate with and are controlled by the controller 205 to provide to, or accept or receive from the controller 205, voice or data traffic or messages or signals corresponding thereto in a known and similar manner as the WLAN receiver 203 and transmitter 207.

Accordingly, the WLAN receiver and transmitter 203, 207 and the WAN receiver and transmitter 204, 208, as controlled by and in cooperation with the controller, functions to provide the communication unit 10 with dual operating mode capability. More particularly, each of the communication units 10, 12 is capable of registering with and obtaining service from a cellular WAN provided by, for example, a home cellular system and corresponding BTS 16 or BTS 20 as well as a WLAN 11 as provided by the enterprise server 14. However, the communication unit 10 can optionally have only one receiver and transmitter that are suitable for and adaptable for interfacing with both a cellular WAN and a WLAN.

The controller 205 is coupled to and operates in a known manner together with a speaker or earpiece 209, a microphone 211, a display 213 and a keyboard 215 or set of keys including a talk key 217 and a respond key 219 to provide a user interface. The keyboard can be a known physical keyboard or virtual keyboard that is part of the display 213 and the display 213 is also known and may be a liquid crystal display or the like. If the keys are part of a virtual keyboard the display 213 will need to be touch sensitive or the like in order to convey information to the controller 205. Similarly the speaker or earpiece, microphone, and alerting device, such as a vibratory device (not shown) are known and widely available.

The controller 205 is essentially a general-purpose processor and, preferably, includes a voice and data processor 221 and an associated memory source 223. The voice and data processor 221 is, preferably, a known processor based element with functionality that will depend on the specifics of the air interface with the enterprise server 14 and the cellular WAN as well as various network protocols for voice and data traffic. The processor 221 will operate to encode and decode voice and data messages to provide signals suitable for a transducer or further processing by the controller 205. The processor 221 may include one or more microprocessors, digital signal processors, and other integrated circuits depending on the responsibilities of the controller with respect to signal processing duties for the WAN and W-LAN that are dependent on the specific air interface technologies, generally known, and are not here relevant. In any event the controller 205 also includes the memory source 223 that may be a combination of known RAM, ROM, EEPROM or magnetic memory.

The memory source 223 is used to store among various other items or software programs etc., a hand-in procedure or processing routine 225 for facilitating or performing one or more of; detecting WLAN coverage, sending and receiving a hand-in request to a target communication unit or from a communication unit when the coverage is detected, accepting a new connection with the target communication unit over the WLAN sent from the target communication unit, and terminating the initial connection with the target communication unit on the initial network as appropriate. The memory source 223 is also used to store an operating system 227 with data and variables as is known, an enterprise or public number 231 used primarily when communicating over the WLAN 11, a cellular or private number 229 used primarily when communicating over the cellular WAN and a dual mode operation routine 233 for enabling the communication unit 10 to register and communicate via different networks with various other units or devices.

The above-mentioned routines are machine readable code or software instructions that when executed by the controller or processor included therewith will result in the controller 205 performing the requisite functions of the communication device 10 such as interfacing with receivers and transmitters, specifically the WLAN and WAN receivers 203, 204 and the WLAN and WAN transmitters 207, 208, user interface including speaker 209, microphone 211, display 213, keyboard 215 and so on including various other routines 235 that are too numerous to mention but that will be evident to one of ordinary skill given a specific communication unit, etc. The reader will appreciate that this listing is merely a brief listing of exemplary routines that will be required or advantageous in providing a hand-in and that other routines and optional applications may be stored in the memory that have not been mentioned. The functions provided by or facilitated by the hand-in procedure 225 will be discussed in more detail below.

The WLAN transmitter 207 is arranged to send signals as formulated by the controller 221, such as, for example, signals representative of an in-band or out of band message as well as other messages to the target communication unit 12, via the WLAN, the enterprise server 14, and the PSTN 18 when the target unit is operating through the BTS 20. The controller 205, which is coupled to the transmitter 207 and operates in accordance with the hand-in procedure 225 etc. in the memory source 223, forwards the signals to the transmitter 207.

The WLAN receiver 203 is arranged to receive signals such as, for example, a call from the enterprise server 14 over the WLAN 11 addressed to the communication unit's public enterprise number 231, or a session initiation protocol message from the enterprise server 14. The controller 205, which is coupled to the WLAN receiver 203 and transmitter 207, and operates in accordance with the hand-in procedure 225, detects coverage for a wireless local area network 11 while the communication unit 10 currently has an initial connection, preferably via the cellular WAN as facilitated by the WAN receiver 204 and WAN transmitter 208, with the target communication unit 12, sends a hand-in request to the target communication unit 12 via the initial connection, initiates or registers with and then establishes, responsive to a SIP INVITE message from the enterprise server 14 triggered by the target unit, a new connection with the target communication unit 12 over the wireless local area network 11 and then terminates the initial connection with the target communication unit 12 as well as other tasks.

Returning to FIG. 1, each of the plurality of access points 15 is a conventional wireless transceiver that is preferably compliant with the IEEE 802.11 standard. The enterprise server 14 is preferably a computer based server for, in conjunction with the plurality of access points 15, providing the WLAN 11 as well as supporting a wired network for an enterprise, such as a business location. The enterprise server 14 includes session initiation protocol entities for setting up packet data based connections that provide a protocol for Voice over Internet Protocol (VoIP) packet data communications and an Internet Protocol private branch exchange (IP PBX) that serves as an internal telephone system within the enterprise server 14 for switching calls between internal users and permitting users to use an external IP network to communicate to the outside via the PSTN 18 as is known.

Figure 3:
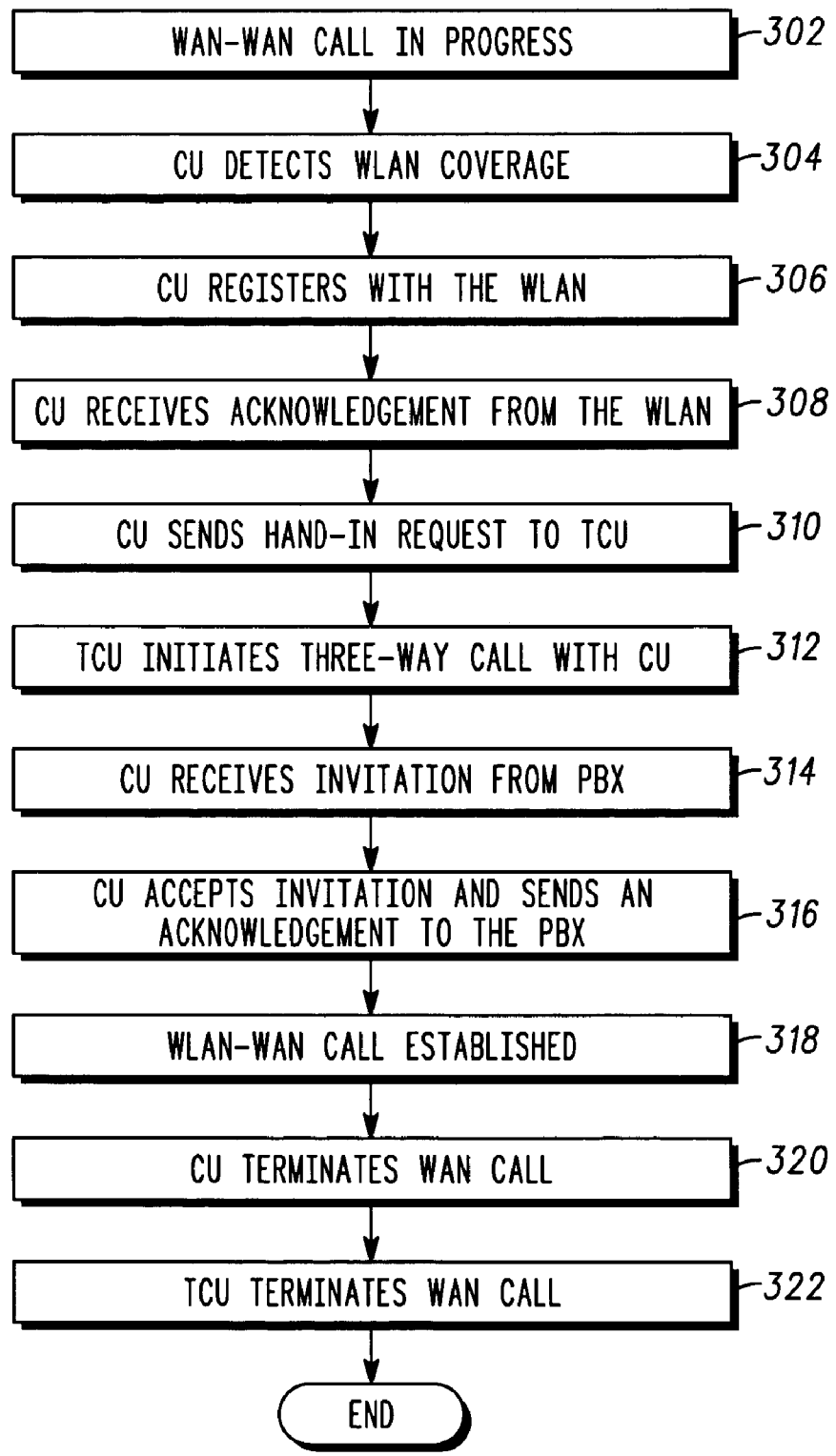
FIG. 3 illustrates a flow chart of a preferred method embodiment of providing a hand-in between different networks.

Referring to FIG. 3, the methodology for providing a hand-in from a cellular WAN to a WLAN will be discussed while also referring to the reference numerals shown in FIGS. 1-2. While this method will be described as implemented with the communications unit of FIG. 2 it is understood that this is exemplary and that other structures would also be suitable for implementing the method. The methodology begins at 302 when the communication unit 10 (shown as CU) currently has an initial connection over the cellular WAN (or an initial network) via the cellular BTS 16 with a target communication unit 12 (shown as TCU in FIG. 3).

At 304, the communication unit 10 moves into or within range of the WLAN 11 coverage area, e.g. walks into a corresponding building and accordingly detects the WLAN coverage 11. The WLAN coverage 11 is, preferably, detected by the WLAN receiver 203 in conjunction with the controller 207.

At 306, the communication unit 10 registers with the enterprise server 14 that provides or facilitates together with the access points 15 the services provided by the WLAN 11 to determine if the communication unit 10 can operate on the WLAN 11. This is accomplished, preferably, by the communication unit 10 sending a SIP registration to a SIP entity at the enterprise server 14 as is known. The registration is preferably a SIP message that is generated by the hand-in procedure 225 and sent to the SIP entity at the enterprise server 14 by the WLAN transmitter 207.

At 308, the communication unit 10 receives an acknowledgement from the SIP entity at the enterprise server 14 to indicate that the registration was received. The acknowledgement is received by the WLAN receiver 203 via one of the access points 15 and processed by the controller 205 in accordance with the hand-in procedure 225.

At 310, the communication unit 10 sends a hand-in request to the target communication unit 12. The hand-in request is an in-band or out of band message generated by the hand-in procedure 225 and sent by the WAN transmitter 208 directly to the target communication unit 12 via the cellular WAN. More particularly, the hand in request may be a tone or DTMF in-band message (e.g. in the audio band), an out of band ISDN user to user message, an SMS out of band message, a packet data message or an out of band internet protocol message as is known.

At 312, the target communication unit 12 initiates a new connection with the communication unit 10 over the WLAN 11. More particularly, the target communication unit 12 makes a three-way call to the communication unit's public enterprise telephone number 231, used primarily for WLAN communication, as the initial call discussed at 302 is still in progress. This is done at the target communication unit by it's WLAN transmitter 207, which is controlled by it's controller 205 also operating in accordance with it's hand-in procedure 225. The IP PBX at the enterprise server 14 resultantly receives the call from the target communication unit 12 and sends an invitation message, preferably a SIP INVITE message, to the communication unit 10 over the WLAN 11 to inform the communication unit 10 of the new connection, thus now three way call with the target communication unit.

At 314, the WLAN receiver 203 of the communication unit 10 receives the invitation message. At 316, the communication unit 10 accepts the invitation message. The hand-in procedure 225 generates an acknowledgement, which is sent to the IP PBX by the WLAN transmitter 206. More generally, at 316 the communication unit 10 accepts a new connection (the three-way call) with the target communication unit 12 over the WLAN from the target communication unit 12.

At 318, the new connection between the communication unit 10 is established with the target communication unit 12. More particularly, the new connection includes a link between the communication unit 10 and the IP PBX at the enterprise server 14, a link from the IP PBX to the PSTN 18, and a link from the PSTN 18 to the BTS 20 and thus to the target communication unit 12.

At 320, the communication unit 10, operating in accordance with the hand-in procedure 225, terminates the initial connection with the target communication unit 12 on the initial network (over the WAN). At 322, the target communication unit 12, also operating in accordance with the hand-in procedure 225, terminates the initial connection with the communication unit 10. More particularly, the target communication unit 12 terminates its original connection link to the PSTN 18 and the methodology ends.

Therefore, the present invention provides a novel apparatus and methodology for providing a hand-in from a WAN to a WLAN. The apparatus includes a communication unit having dual-mode operating capability and a hand-in procedure included in the communication unit memory. The communication unit preferably includes a WAN receiver and transmitter and a WLAN receiver and transmitter and a dual mode operation routine for providing the dual-mode operating capability. However, the communication unit may also include a single receiver and transmitter with the capability of operating on both the WAN and WLAN in accordance with the dual mode operation routine.

The communication unit, or the controller operating in accordance with the hand-in procedure, sends a hand-in request to a target communication unit when WLAN coverage is detected, accepts a new connection with the target communication unit over the WLAN, and terminates the initial connection with the target communication unit on the initial network.

The target communication unit, or the controller operating in accordance with the hand-in procedure, receives a hand-in request from the communication unit, initiates a new connection with the communication unit over a wireless local area network, and terminates the initial connection with the communication unit.

The initial connection may be a connection to a WAN or a first WLAN. The new connection may be a first WLAN or a second WLAN. In other words, the hand-in may be from a WAN to a WLAN or from a first WLAN to a second WLAN.

Thus a novel and inventive communication unit with dual-mode operating capability has been described and discussed that includes a receiver and a transmitter for supporting an initial connection with another communication unit on a first wireless network; and a controller, coupled to and controlling the receiver and transmitter, to maintain the initial connection and to either receive messages from or send messages to the other communications unit to effectuate a new connection over a second wireless network, thereby facilitating a hand-in from one network to another.

This novel apparatus and methodology implemented within the communication unit 10 and target communication unit 12 results in numerous advantages. The hand-in is primarily performed between the communication unit 10 and the target communication unit 12. Therefore, systems utilizing this methodology are not required to have additional equipment at the enterprise server and will thereby be more cost effective then conventional approaches. Further, the methodology is reusable across IP-PBX vendors.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for providing a wireless dual-mode mobile communication unit with a hand-in from an initial network to a wireless local area network while the wireless dual-mode mobile communication unit currently has an initial connection with a target wireless dual-mode mobile communication unit on the initial network, the method comprising:

detecting by the wireless dual-mode mobile communication unit coverage for the wireless local area network;

sending from the wireless dual-mode mobile communication unit a hand-in request to the target wireless dual-mode mobile communication unit when the coverage is detected;

accepting by the wireless dual-mode mobile communication unit a new connection with the target wireless dual-mode mobile communication unit over the wireless local area network, the new connection initiated by the target wireless dual-mode mobile communication unit; and terminating the initial connection with the target wireless dual-mode mobile communication unit on the initial network.

2. The method of claim 1, wherein the sending of the hand-in request further comprises sending one of an in-band and an out of band message to the target wireless dual-mode mobile communication unit.

3. The method of claim 1, wherein the sending of the hand-in request further comprises sending a tone in-band message to the target wireless dual-mode mobile communication unit.

4. The method of claim 1, wherein the sending of the hand-in request further comprises sending an out of band Integrated Services Digital Network user to user message to the target wireless dual-mode mobile communication unit.

5. The method of claim 1, wherein the sending of the hand-in request further comprises sending a Short Messaging Service out of band message to the target wireless dual-mode mobile communication unit.

6. The method of claim 1, wherein the sending of the hand-in request further comprises sending a packet data message to the target wireless dual-mode mobile communication unit.

7. The method of claim 1, wherein the sending of the hand-in request further comprises sending an out of band internet protocol message to the target wireless dual-mode mobile communication unit.

8. The method of claim 1, wherein the initial network is a cellular wide area network.

9. The method of claim 1, wherein the initial network is another wireless local area network.

10. The method of claim 1, further comprising registering with the wireless local area network after detecting the coverage for the wireless local area network to determine if the communication unit can operate on the wireless local area network.

11. A method for providing a wireless dual-mode mobile communication unit with a hand-in from an initial network to a wireless local area network while a target wireless dual-mode mobile communication unit currently has an initial connection with the wireless dual-mode mobile communication unit on the initial network, the method comprising:

receiving by the target wireless dual-mode mobile communication unit a hand-in request from the wireless dual-mode mobile communication unit;

initiating by the target wireless dual-mode communication unit a new three-way connection with the wireless dual-mode mobile communication unit over the wireless local area network; and terminating the initial connection with the wireless dual-mode mobile communication unit.

12. The method of claim 11, wherein the receiving by the target dual-mode communication unit the hand-in request from the wireless dual-mode mobile communication unit further comprises receiving by the target dual-mode communication unit one of an in-band and an out of band message from the wireless dual-mode mobile communication unit.

13. The method of claim 11, wherein the receiving by the target dual-mode communication unit the hand-in request from the wireless dual-mode mobile communication unit further comprises receiving by the target dual-mode communication unit one of a tone in-band message, an out of band Integrated Services Digital Network user to user message, a Short Messaging Service out of band message, a packet data message and an out of band internet protocol message from the wireless dual-mode mobile communication unit.

14. The method of claim 11, wherein the initiating by the target dual-mode communication unit of the new three-way connection with the wireless dual-mode mobile communication unit over the wireless local area network further comprises initiating by the target dual-mode communication unit the new connection via a public enterprise number associated with the communication unit.

* * * * *